United States Patent Office 3,129,248
Patented Apr. 14, 1964

---

3,129,248
PREPARATION OF FLUOROCYCLOBUTANONES
David C. England, Wilmington, Del., assignor to E. I. du Pont de Nemours and Company, Wilmington, Del., a corporation of Delaware
No Drawing. Filed July 18, 1960, Ser. No. 43,331
14 Claims. (Cl. 260—586)

This application, a continuation-in-part of my copending application Serial Number 717,805, filed February 27, 1958, and now abandoned, relates to the preparation of novel cyclobutanones. More specifically, it relates to, and has as its principal object provision of, methods for the preparation of polyfluorocyclobutanones, i.e., cyclobutanones wherein a plurality of fluorine atoms are bonded to ring carbon.

U.S. Patents 2,712,554 and 2,712,555 disclose theoretically some halogenated cyclobutanones including a polyfluorocyclobutanone. Another such compound perfluorocyclobutanone, is described and claimed in U.S. Patent 3,039,995. The present invention provides a process for preparing certain of the various polyfluorocyclobutanones, i.e., those in which there are two fluorine atoms on each of the 3- and 4-carbons and two halogen atoms, alike or different, of atomic number 9–35 on the 2-carbon. These compounds, and the hydrates and hemiketals thereof, can be represented by the structural formulas:

$$\begin{array}{c} F_2C\!\!-\!\!C\!\!=\!\!O \\ |\phantom{xx}4\phantom{x}1\phantom{xx}| \\ |\phantom{xx}3\phantom{x}2\phantom{xx}| \\ F_2C\!\!-\!\!CX_2 \end{array} \qquad \begin{array}{c} OH \\ | \\ F_2C\!\!-\!\!C\!\!-\!\!OH \\ |\phantom{xxxx}| \\ F_2C\!\!-\!\!CX_2 \end{array}$$

and $$\begin{array}{c} OH \\ | \\ F_2C\!\!-\!\!C\!\!-\!\!OR \\ |\phantom{xxxx}| \\ F_2C\!\!-\!\!CX_2 \end{array}$$

wherein the X's, which can be alike or different, are halogen, of atomic number no greater than 35 and most especially of atomic number no greater than 17 and R is a monovalent, aliphatically saturated, hydrocarbyl radical, generally of no more than seven carbons.

These 3,3,4,4-tetrafluoro-2,2-dihalocyclobutanones are now readily prepared by the direct strong acid hydrolysis of the corresponding 1,3,3,4,4-pentafluoro-2-2-dihalo-1-hydrocarbyloxycyclobutanes, i.e., compounds having the identical ring structure and the same substituents varying only in that the doubly bonded oxygen in the 1-position is replaced by a fluorine atom singly linked to the 1-ring carbon and an external hydrocarbyloxy group also singly linked to said 1-carbon. These intermediates can thus be represented by the structural formula:

$$\begin{array}{c} F \\ | \\ F_2C\!\!-\!\!C\!\!-\!\!OR \\ |\phantom{xxxx}| \\ F_2C\!\!-\!\!CX_2 \end{array}$$

wherein the X's have their previous significance and R, as before, is a monovalent hydrocarbyl radical free of aliphatic unsaturation including alkyl, aryl, alkaryl, aralkyl, and cycloalkyl, generally of no more than seven carbons.

As will be explained later the products from the hydrolysis are the tetrafluorodihalocyclobutanone hydrates, i.e., compounds of the structure:

$$\begin{array}{c} OH \\ | \\ F_2C\!\!-\!\!C\!\!-\!\!OH \\ |\phantom{xxxx}| \\ F_2C\!\!-\!\!CX_2 \end{array}$$

The desired 3,3,4,4-tetrafluoro-2,2-dihalocyclobutanones are readily obtained therefrom by heating in the presence of a strong dehydrating agent such as phosphorous pentoxide or concentrated sulfuric acid in the respective temperature ranges of 60–100° C. and 100–180° C. or higher. The 1,3,3,4,4-pentafluoro-2,2-dihalo-1-hydrocarbyloxycyclobutane starting materials are readily obtained by the cycloaddition at elevated temperatures (e.g. 125–250° C. or higher) usually in sealed reactors under the autogenous pressure of the requisite difluoroperhaloolefin and perfluorovinyl hydrocarbyl ether, i.e.:

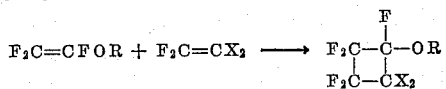

where the X's and R are as above. The perfluorovinyl hydrocarbyl ethers are readily prepared by reacting the appropriate sodium (or other alkali metal) alkoxide with tetrafluoroethylene as illustrated in Example I below. These ethers are generally liquids, with boiling points dependent upon their molecular weight, and are soluble in the common organic solvents such as ether, dioxane and the like.

The 3,3,4,4-tetrafluoro-2,2-dihalocyclobutanones and processes for the preparation thereof are illustrated in greater detail but are not to be limited by the following more specific examples in which the parts given are by weight.

EXAMPLE I

*Part A.—Preparation of Perfluorocyclobutyl Methyl Ether*

Each of three thick-walled cylindrical glass reactors roughly 24 diameters long and of total internal capacity corresponding to 150 parts of water was cooled in a liquid nitrogen bath and charged with 11.5 parts of methyl trifluorovinyl ether (for preparation see below), 0.5 part of phenothiazine inhibitor, about 0.5 part of a commercially available terpene stabilizer (see U.S. Patent 2,407,405) and 23 parts of tetrafluorethylene. The reactors were then sealed and heated to 150° C. and held at this temperature for 12 hours. The sealed reactors were allowed to cool to room temperature, then cooled to liquid nitrogen temperatures, and finally opened to the atmosphere. The reactors were warmed carefully to vent any unreacted tetrafluoroethylene or any tetrafluorethylene dimer (perfluorocyclobutane) formed during the reaction. The remaining liquid reaction products were combined and fractionated by distillation. There was thus obtained 36.7 parts (57.7% of theory) of perfluorocyclobutyl methyl ether, i.e., 1,2,2,3,3,4,4,-heptafluoro-1-methoxycyclobutane, as a clear, colorless liquid boiling at 59° C. at atmospheric pressure; $n_D^{25}$, 1.2875.

*Anal.*—Calcd. for $C_5H_3F_7O$: F, 62.7%. Found: F, 62.6%.

There was also recovered six parts of the dimer of methyl trifluorovinyl ether, i.e., hexafluorodimethoxycyclobutane, boiling at 114–119° C. at atmospheric pressure.

Methyl trifluorovinyl ether, used above in the preparation of perfluorocyclobutyl methyl ether, was prepared as follows:

A mixture of 33.3 g. (0.62 mole) of dry sodium methoxide and 155 g. of sodium-dried dioxane was placed in a 320-ml. stainless steel bomb. The bomb was sealed, pressured to 300 p.s.i. with tetrafluoroethylene, and heated to 100° C. under agitation. The bomb was repressured with tetrafluoroethylene as necessary to maintain a pressure of 300 p.s.i. The reaction was continued until no further decrease in pressure occurred. The bomb was cooled and the exit gas led into traps immersed in a solid carbon dioxide acetone bath. The greater portion of the recovered material boiled below −20° C. The trap residue was combined with the contents of the bomb and the combined material was distilled through a 12-inch Vigreux column. Material weighing 30.7 g. and boiling in the range 21–45° C. was collected. This material was redistilled through a 3-foot low temperature column packed with glass helices. Nineteen grams of methyl trifluorovinyl ether, boiling at 10.5–12.5° C., was collected. This product strongly reduced potassium permanganate solution and bromine.

*Part B.—Preparation of Perfluorocyclobutanone Hydrate, i.e., 2,2,3,3,4,4-Hexafluoro-1,1-Dihydroxycyclobutane*

A heavy-walled glass reactor, as described in Part A, was charged with eight parts of the above perfluorocyclobutylmethyl ether and 18.8 parts of concentrated sulfuric acid. The reactor and contents were then cooled and the reactor sealed and heated at 150° C. for twelve hours. The reactor was then allowed to cool to room temperature, opened, and the substantially homogenous, light brown, liquid reaction mixture purified by distillation under reduced pressure. There was thus obtained 5.9 parts (80% of theory) of perfluorocyclobutanone hydrate, i.e., 2,2,3,3,4,4-hexafluoro-1,1-dihydroxycyclobutane, as a clear, colorless liquid boiling at 59° C. under a pressure corresponding to 50 mm. of mercury.

*Part C.—Preparation of Perfluorocyclobutanone*

A glass reactor of internal capacity corresponding to 200 parts of water, fitted with a dropping funnel and connected to a trap cooled with a solid carbon dioxide/acetone bath, was charged with 25 parts of phosphorus pentoxide. The reactor and attached system were then evacuated and filled with nitrogen to a pressure corresponding to 200 mm. of mercury. Molten perfluorocyclobutanone hydrate (6.5 parts) was then added through the dropping funnel. On warming the glass reactor an exothermic reaction occurred and the desired perfluorocyclobutanone collected as a crystalline solid in the solid carbon dioxide/acetone-cooled trap. On examination the ketone was found to boil at 0° C. at atmospheric pressure. Infrared and nuclear magnetic resonance spectra were entirely consistent with the perfluorocyclobutanone structure.

*Analysis.*—Calcd. for $C_4F_6O$: F, 64.0%; M.W., 178. Found: F, 62.2%, 62.5%; M.W., 176.

The molecular weight was determined by direct weighing, vapor density procedure.

*Part D.—Preparation of Perfluorocyclobutanone Methyl Hemiketal*

To a trap cooled in a solid carbon dioxide/acetone bath and containing 100 parts of crude perfluorocyclobutanone (about 90 parts pure perfluorocyclobutanone with sulfur dioxide impurity) was added 16 parts of methanol (equimolar on the ketone). The trap and the reaction mixture were then allowed to warm to room temperature, during which time the sulfur dioxide contaminant distilled out. The remaining liquid residue was put through a precision fractionation column, and all the material was found to distill at 113° C. at atmospheric pressure. There was thus obtained 103 parts (97% of theory, assuming 90% pure starting material) of the methyl hemiketal of perfluorocyclobutanone, i.e., 1-hydroxy-1-methoxyhexafluorocyclobutane; $n_D^{25}$, 1.3289. The nuclear magnetic resonance spectra of the pure hemiketal were completely consistent with the ketal structure.

*Analysis.*—Calcd. for $C_5H_4F_6O_2$: C, 28.6%; H, 1.9%; F, 54.3%. Found: C, 29.0%; H, 2.4%; F, 52.9%.

The pure perfluorocyclobutanone was further characterized by alkaline ring scission of the above methyl hemiketal to a mixture of 4H-hexafluorobutyric acid and the methyl ester thereof. Thus, a reactor was charged with 21 parts of the above methyl hemiketal of perfluorocyclobutanone, 25 parts (two molar on the hemiketal) of dimethyl sulfate, and 28 parts (two molar on the hemiketal) of potassium carbonate. On mixing, a spontaneous exothermic reaction occurred. The resultant reaction mixture was separated by fractionation through a precision distillation column. There was thus obtained 16 parts of methyl 4H-hexafluorobutyrate as a clear, colorless liquid boiling at 89° C. at atmospheric pressure; $n_D^{25}$, 1.3170, and four parts of 4H-hexafluorobutyric acid as a clear, colorless liquid boiling at 149° C. at atmospheric pressure; $n_D^{25}$, 1.3158. The nuclear magnetic resonance spectra for the two products were consistent with the ester and acid structures.

*Analysis.*—Calc'd for the acid $C_4H_2F_6O_2$: C, 24.5%; H, 1.0%; F, 58.2%. Found: C, 24.6%; H, 1,2%; F, 57.0%.

The perfluorocyclobutanone was still further characterized by essentially quantitative conversion to perfluorocyclopropane upon irradiation with ultraviolet light. Thus, two thick-walled cylindrical glass reactors, as described above in Part A, varying only in possessing an internal capacity corresponding to 130 parts of water, were charged, respectively, with seven and eleven parts of perfluorocyclobutanone. The reactors were sealed and exposed for sixty hours to the radiation from a commercially available 85-watt mercury arc lamp rated at 2800 lumens (a General Electric H85–C3 lamp). The reactors were then cooled in a liquid nitrogen bath, opened, and the gaseous products vented to the atmosphere. A sample of the gaseous material was examined by infrared spectroscopy and shown conclusively to be carbon monoxide. The liquid reaction products remaining were combined and distilled in a low temperature still. There was thus obtained 10.5 parts (69% of theory) of perfluorocyclopropane, boiling at atmospheric pressure at −32° C. The boiling point and the infrared spectrum of the product agreed with those reported by Haszeldine, J. Chem. Soc., 1953, 3761, who obtained the product in 3% yield by irradiating tetrafluoroethylene with ultraviolet light. The conversion to the perfluorocyclopropane is believed to be essentially quantitative in the present synthesis, and the reported yield of only 69% of theory is attributed largely to the difficulties in separating and purifying such a low boiling product.

EXAMPLE II

Each of three heavy-walled glass reactors was charged with 15 parts of perfluorocyclobutyl methyl ether and 36.8 parts of concentrated sulfuric acid, sealed, heated at 150° C. for twelve hours, cooled, and finally opened, all as given above in Example I, Part B. The resulting liquid reaction products were combined and distilled at atmospheric pressure through a fractionation column attached to a trap cooled in a solid carbon dioxide/acetone mixture. There was thus obtained from the column water-condenser as a clear, colorless liquid distillate 5.8 parts (13.9% of theory) of perfluorocyclobutane hydrate, i.e., 2,2,3,3,4,4 - hexafluoro-1,1-dihydroxycyclobutane, boiling at 125° C. at atmospheric pressure. There was also obtained in the solid carbon dioxide-cooled trap 28 parts (74.5% of theory) of perfluorocyclobutanone exhibiting a boiling point of 0° C. at atmospheric pressure. The total yield was thus 88.4% of theory.

EXAMPLE III

Each of four heavy-walled glass reactors was charged with twelve parts of perfluorocyclobutyl methyl ether and 36.8 parts of concentrated sulfuric acid, and the reactors were then cooled, sealed, heated at 150° C. for twelve hours, and finally opened, all as described previously in Example I, Part B. The resulting brown, liquid reaction products were combined and transferred to a glass stillpot of internal capacity corresponding to 500 parts of water, cooled in a solid carbon dioxide/acetone bath. Ten parts of phosphorus pentoxide was then added and the stillpot connected to a fractionation column to which was attached a solid carbon dioxide/acetone-cooled trap. The reaction mixture was heated, and after heating strongly, there was obtained in the solid carbon dioxide-cooled trap 36 parts (90% of theory) of perfluorocyclobutanone.

EXAMPLE IV

Part A.—Preparation of Perfluorocyclobutyl Propyl Ether

A heavy-walled glass reactor was charged with 14 parts of propyl trifluorovinyl ether and 0.5 part of phenothiazine inhibitor, and the reactor was then cooled in a liquid nitrogen bath, charged with 23.5 parts of tetrafluoroethylene, sealed, heated at 150° C. for 12 hours, cooled, opened, vented to the atmosphere to exhaust unreacted tetrafluoroethylene and possible by-product tetrafluoroethylene dimer, all as described in Example I, Part A. The remaining liquid reaction product was fractionated through a precision still. There was thus obtained 13 parts (54% of theory) of perfluorocyclobutylpropyl ether, i.e., heptafluoro-n-propoxycyclobutane, as a clear, colorless liquid boiling at 90° C. at atmospheric pressure; $n_D^{25}$, 1.3132.

*Anal.*—Calcd. for $C_7H_7OF_7$: F, 55.4%. Found: F, 55.1%.

The nuclear magnetic resonance spectrum was entirely consistent with the perfluorocyclobutylpropyl ether structure. There was also recovered by distillation two parts of propyl trifluorovinyl ether dimer, i.e., hexafluorodipropoxycyclobutane.

Part B.—Preparation of Perfluorocyclobutanone Hydrate

Each of four heavy-walled glass reactors was charged with 10 parts of the above perfluorocyclobutylpropyl ether and 36.8 parts of concentrated sulfuric acid, sealed, heated for eight hours at 150° C., cooled, opened at liquid nitrogen temperature, and allowed to warm to room temperature, all in the manner described in detail in Example I, Part B. On warming to room temperature, it was noted that some silicon tetrafluoride and sulfur dioxide by-products were evolved. The reactors were then individually heated with an open gas flame while attached to a glass trap cooled in a solid carbon dioxide/acetone bath. White crystals of perfluorocyclobutanone hydrate collected in the trap. The solid product was rinsed out of the trap with ether and then fractionated through a precision distillation column. There was thus obtained 11.6 parts (35.7% of theory) of perfluorocyclobutanone hydrate as a clear, colorless liquid boiling at 126–128° C. at atmospheric pressure. On cooling, the liquid product solidified, and after recrystallization from cyclohexane, the pure perfluorocyclobutanone hydrate was obtained as white crystals melting at 50–52° C.

*Anal.*—Calcd. for $C_4H_2O_2F_6$: C, 24.5%; H, 1.0%; F, 58.2%. Found: C, 24.0%; H, 1.3%; F, 56.3%.

A sample of the hydrate was titrated with dilute aqueous sodium hydroxide solution, using a pH meter to follow the titration. The product exhibited an indicated pKa value of 6.75 and a neutral equivalent of 195 versus the theoretical value of 196. Upon back titration with acid, the pKa was observed to be about 2, indicating that a ring opening reaction occurred during the neutralization with the aqueous sodium hydroxide forming the sodium salt of 4-hydroperfluorobutyric acid, i.e., 4H-hexafluorobutyric acid.

EXAMPLE V

Part A.—Preparation of 2-Chloro-1,2,3,3,4,4-Hexafluorocyclobutyl Methyl Ether Each of two heavy-walled glass reactors was charged with 11.5 parts of methyl trifluorovinyl ether, 0.5 part of phenothiazine inhibitor, and about 0.5 part of a commercially available terpene stabilizer, and the reactors were then cooled to liquid nitrogen temperatures, charged with 33 parts of chlorotrifluoroethylene, sealed, heated at 150° C. for twelve hours, cooled to liquid nitrogen temperature, opened, and finally vented to the atmosphere, all as described in Example I, Part A. The reactors were allowed to warm to room temperature to remove any unreacted chlorotrifluoroethylene. The remaining liquid reaction products were combined and the products separated by distillation through a precision fractionation column. There was thus recovered 5.5 parts of chlorotrifluoroethylene dimer, i.e., dichlorohexafluorocyclobutane, as a clear, colorless liquid boiling at 57–64° C. at atmospheric pressure and 19.3 parts (42% of theory) of 2-chloro-1,2,3,3,4,4-hexafluorocyclobutyl methyl ether as a clear, colorless liquid boiling mostly at 87.5° C. at atmospheric pressure.

*Anal.*—Calcd. for $C_5H_3F_6ClO$: Cl, 15.5%. Found: Cl, 15.2%.

The nuclear magnetic resonance spectrum of the liquid product was entirely consistent with the 2-chlorohexafluorocyclobutyl methyl ether structure. There was also recovered in the distillation 4.5 parts of the dimer of methyl trifluorovinyl ether, i.e., hexafluorodimethoxycyclobutane, as a clear, colorless liquid boiling at 114° C. at atmospheric pressure.

An identical preparation varying only in involving 40 parts of chlorotrifluoroethylene resulted in the formation of 2-chloro-1,2,3,3,4,4-hexafluorocyclobutyl methyl ether in overall yield of 54% of theory.

Part B. Preparation of 2-Chloro-2,3,3,4,4-Pentafluorocyclobutanone

A heavy-walled glass reactor of the type previously described was charged with 26 parts of the above 2-chloro-1,2,3,3,4,4-hexafluorocyclobutyl methyl ether and 73.6 parts of concentrated sulfuric acid. The reactor was sealed and then heated at 150° C. for twelve hours. The reactor was then cooled, opened, and the brown, nearly homogeneous liquid reaction mixture poured into a stillpot of internal capacity corresponding to 200 parts of water. The pot and the contents thereof were then cooled in a solid carbon dioxide/acetone bath and 15 parts of phosphorus pentoxide then added. The stillpot was then connected to a distillation column, and by heating strongly there was finally obtained 18.8 parts (85% of theory) of 2-chloro-2,3,3,4,4-pentafluorocyclobutanone as a clear, colorless liquid boiling at 34° C. at atmospheric pressure.

*Anal.*—Calcd. for $C_4F_5ClO$: F, 48.8%; Cl, 18.2%. Found: F, 46.6%; Cl, 18.7%.

The 2-chloro-2,3,3,4,4-pentafluorocyclobutanone was further characterized by quantitative conversion to chloropentafluorocyclopropane (B.P. at 760 mm. of Hg pressure, 3–4° C.) upon irradiation in a sealed glass reactor with the mercury arc lamp described in Example I. The nuclear magnetic resonance spectrum of the cyclopropane was entirely consistent with that structure and showed no trace whatever of the characteristic spectrum of the starting ketone.

*Anal.*—Calcd. for $C_3F_5Cl$: Cl, 21.3%; F, 57.1%. Found: Cl, 21.0%; F, 56.6%.

EXAMPLE VI

Part A.—Preparation of 2,2-Dichloro-1,3,3,4,4-Pentafluorocyclobutyl Methyl Ether Example I, Part A, was repeated, substituting in each of the reactors 39 parts of 1,1-dichloro-2,2-difluoroethylene for the 23 parts of tetrafluoroethylene and increasing the reaction temperature to 175° C. The liquid reaction products after workup as described in Example I, Part A, were combined and purified by fractionation through a precision distillation column. There was thus obtained 55 parts (75% of theory) of crude 2,2-dichloro-1,3,3,4,4-pentafluorocyclobutyl methyl ether as a clear, colorless liquid boiling at 115–120° C. contaminated with the cyclic dimers of each of the reactants, i.e., dimethoxyhexafluorocyclobutane and tetrachlorotetrafluorocyclobutane. A cut boiling at 117° C. at atmospheric pressure; $n_D^{25}$, 1.3650, was taken as an analytical sample.

*Anal.*—Calcd. for $C_5H_3OCl_2F_5$: Cl, 28.9%; F, 38.8%. Found: Cl, 26.5%; F, 39.5%.

Part B.—Preparation of 2,2-Dichloro-3,3,4,4-Tetrafluorocyclobutanone

Each of three heavy-walled glass reactors of the type previously described was charged with 14 parts of the above crude methyl 2,2-dichloro-1,3,3,4,4-pentafluorocyclobutyl ether and 46 parts of concentrated sulfuric acid. The reactors were cooled, sealed, and heated at 165° C. for twelve hours. The reactors were then cooled in a solid carbon dioxide/acetone bath, opened, and the liquid reaction mixtures combined in a stillpot cooled in a solid carbon dioxide/acetone bath, after which 25 parts of phosphorus pentoxide was added. The stillpot was then connected to a distillation column, and upon heating the pot there was obtained by distillation 23 parts (62% of theory) of 2,2-dichloro-3,3,4,4-tetrafluorocyclobutanone as a clear, colorless liquid boiling at 67.5° C. at atmospheric pressure; $n_D^{25}$, 1.3590. There was also recovered 4.5 parts of dichlorodifluoroethylene dimer, i.e., tetrachlorotetrafluorocyclobutane, which was present in the starting crude methyl 2,2-dichloro-1,3,3,4,4-pentafluorocyclobutyl ether. The nuclear magnetic resonance spectrum of the ketone was entirely consistent with the 2,2-dichloro-3,3,4,4-tetrafluorocyclobutanone structure.

*Anal.*—Calcd. for $C_4Cl_2F_4O$: Cl, 33.6%; F, 36.0%. Found: Cl, 33.7%; F, 35.9%.

The dichlorotetrafluorocyclobutanone was further characterized by quantitative conversion upon irradiation with a mercury arc lamp as above to carbon monoxide and 1,1-dichloro-2,2,3,3-tetrafluorocyclopropane. The latter is a clear, colorless liquid boiling at 40° C. at atmospheric pressure.

*Anal.*—Calcd. for $C_3Cl_2F_4$: C, 19.7%; H, 0.0%; F, 41.5%; Cl, 38.7%. Found: C, 20.0%; H, <0.1%; F, 41.3%; Cl, 38.6%.

EXAMPLE VII

Part A.—Preparation of 2-Bromo-2,2,3,3,4,4-Hexafluorocyclobutyl Methyl Ether A mixture of 161 parts of bromotrifluoroethylene, 112 parts of methyl trifluorovinyl ether, one part of phenothiazine inhibitor, and about 0.4 part of a commercially available terpene stabilizer was heated in a pressure-resistant stainless steel reactor of internal capacity corresponding to 1,000 parts of water under autogenous pressure at 175° C. for 12 hours. The reactor was then cooled to room temperature and opened and the reaction mixture purified by distillation. There was obtained a small quantity of bromotrifluoroethylene dimer, i.e., dibromohexafluorocyclobutane, as a clear, colorless liquid boiling at 94° C. at atmospheric pressure. Continued distillation afforded 143 parts (52% of theory) of 2-bromo-1,2,3,3,4,4-hexafluoro-1-methoxycyclobutane as a clear, colorless liquid boiling at 101–110° C. at atmospheric pressure.

*Anal.*—Calcd. for $C_5H_3BrF_6O$: C, 26.4%; H, 1.1%. Found: C, 25.9%; H, 1.6%.

The infrared spectrum was wholly consistent with the bromohexafluoromethoxycyclobutane structure.

Part B.—Preparation of 2-Bromo-2,3,3,4,4-Pentafluorocyclobutanone

A mixture of 143 parts of the above 2-bromo-1,2,3,3,4,4-hexafluoro-1-methoxycyclobutane, 460 parts of concentrated sulfuric acid, and 12 parts of water was heated under autogenous pressure in a pressure-resistant reaction vessel lined with an alloy of iron, nickel, and molybdenum at 125° C. for 12 hours. The reactor was allowed to cool to room temperature and the reaction mixture removed and placed in a stillpot cooled with an external solid carbon dioxide/acetone bath to which was then added 100 parts of phosphorus pentoxide. Upon heating the still pot and collecting the product through a precision fractionation column, there was thus obtained 53 parts (42% of theory) of 2-bromo-2,3,3,4,4-pentafluorocyclobutanone as a clear, colorless liquid boiling at 52.0–54.5° C.

*Anal.*—Calcd. for $C_4BrF_5O$: C, 20.1%; F, 39.8%. Found: C, 20.4%; F, 40.4%.

The infrared and nuclear magnetic resonance spectra were wholly consistent with the 2-bromo-2,3,3,4,4-pentafluorocyclobutanone structure.

The present invention is generic to the preparation of 3,3,4,4-tetrafluoro-2,2-dihalocyclobutanones, wherein the halogen atoms on the 2-carbon, which can be alike or different, are of atomic number from 9 to 35 and preferably from 9 to 17. The 3,3,4,4-tetrafluoro-2,2-dihalocyclobutanones, as indicated above, are readily prepared by the cycloaddition reaction between the requisite difluoroperhaloolefin and a perfluorovinyl hydrocarbyl ether followed by strong acid hydrolysis of the resultant 1,3,3,4,4-pentafluoro - 2,2 - dihalo-1-hydrocarbyloxycyclobutane. Thus, in addition to the specific compounds given in the foregoing detailed examples, there can be prepared by the same procedures the following compounds further illustrative of this invention. Perfluorovinyl benzyloxy ether by cycloaddition with 1,1-dibromo-2,2-difluoroethylene forms the intermediate 1-benzyloxy-2,2-dibromo-1,3,3,4,4-pentafluorocyclobutane which by strong acid hydrolysis, e.g., with concentrated sulfuric acid at 150–200° C., is readily converted to 2,2-dibromo-3,3,4,4-tetrafluorocyclobutanone. Cycloaddition of perfluorovinyl n-heptyloxy ether with 1-bromo-1-chloro-2,2-difluoroethylene gives the intermediate 2-bromo-2-chloro-1,3,3,4,4-pentafluoro-1-n-heptyloxycyclobutane which by strong acid hydrolysis is readily converted to the desired 2-bromo-2-chloro-3,3,4,4-tetrafluorocyclobutanone. Cycloaddition of perfluorovinyl cyclohexyl ether with 1-bromo-1,2,2-trifluoroethylene gives the intermediate 2-bromo-1-cyclohexyloxy - 1,2,3,3,4,4 - hexafluorocyclobutane which by strong acid hydrolysis is readily converted to the desired 2-bromo-2,3,3,4,4-pentafluorocyclobutanone.

These reactions can be effected properly in the presence or absence of liquid organic reaction media which, if present, should preferably be anhydrous. Any liquid organic diluent can be used, and generally speaking, the most common are the normally liquid hydrocarbons and polyfluorohydrocarbons, including aliphatic and aromatic compounds such as the hexanes, heptanes, octanes, and the like; benzene, toluene, the xylenes, and the like; cycloaliphatic hydrocarbon solvents such as cyclohexane and the like; the polyfluoro aliphatic hydrocarbons, e.g., 1,1,2,2-tetrafluoro-3,3-dimethylbutane and the like; the polyfluoro aliphatic/cycloaliphatic hydrocarbons, e.g., perfluorodimethylcyclohexane, and the like. Preferably no diluent is used.

The hydrolysis of the 2,2-dihalo-3,3,4,4-tetrafluorocyclobutyl ethers to the corresponding 2,2-dihalo-3,3,4,4-tetrafluorocyclobutanones stoichiometrically requires one molar proportion of water for each molar proportion of ether hydrolyzed. The cyclobutanones as formed, however, react with another molar proportion of water to give the corresponding 2,2-dihalo-3,3,4,4-tetrafluorocyclobutanone hydrates. In the preferred conditions in the sense of maximum conversion and yield, two molar proportions of water should, accordingly, be present for each molar proportion of the ether to be hydrolyzed.

The preferred two molar proportions of water can be supplied as such to the hydrolysis mixture or can be supplied by the acid, provided sufficient quantities thereof are used. While these two molar proportions are preferred, they are not necessarily present. If they are not, less of the cyclobutyl ether will be hydrolyzed, i.e., starting material will be recovered, and the product formed will be the cyclobutanone hydrate to the extent that sufficient water is present to form the hydrate. Thus, if only one molar proportion is present, the maximum possible yield of ketone hydrate would be 50% of theory. While operation under these conditions is perfectly feasible with the starting material being easily recoverable and easily separately further hydrolyzed by additional treatment with additional quantities of acid, such conditions are obviously less desirable and accordingly at least two molar proportions of water, based on the ether to be hydrolyzed, should be present.

The strong acid needed for the hydrolysis of the 2,2-dihalo-3,3,4,4-tetrafluorocyclobutyl hydrocarbyl ethers will be concentrated sulfuric acid. The preferred concentration of the sulfuric acid will not exceed 98% by weight and will not be below about 90% by weight. However, by effecting longer reaction times and utilizing higher reaction temperatures, the hydrolysis can be properly achieved, albeit possibly at lower conversions and yields, through the use of more dilute sulfuric acid in the range from 75–85% by weight.

The reaction temperatures for the hydrolysis will vary in the range 125–300° C. for reaction times of from a few to as long as 24 hours or more. As is true in most chemical reactions, the higher temperatures and longer reaction times will be used under the less stringent reaction conditions, i.e., with the less concentrated sulfuric acid solutions. Because of the low boiling nature of some of these 2,2-dihalo-3,3,4,4-tetrafluorocyclobutanones, the hydrolysis reaction will generally be carried out under sealed conditions, and the reaction mixtures will generally be cooled down prior to opening the reactor. The hydrolysis step can, however, be done in a reactor with vent and trapping means, whereby any low boiling ketone would be trapped as formed.

The reaction mixtures, as described in the preceding, will usually comprise a mixture of the ketone hydrate and unreacted ether. However, if process conditions are carried out in the preferred range, including the presence of the preferred two molar proportions of water, the reaction mixture will consist in almost 100% of theory of the ketone hydrate along with allied hydrolysis by-products. In either event from reaction mixtures involving excess sulfuric acid a substantial proportion, e.g., of the order of magnitude of 80% of theory, of the desired ketone can be obtained by heating at 100–180° C, and distilling at atmospheric pressure. By this technique, it is not, however, possible to convert all the hydrate to the ketone. Accordingly, for maximum conversion and yield to the desired ketone, the final distillation or purification step will be carried out in the presence of a strong dehydrating agent, conventionally phosphorus pentoxide, at temperatures of about 60–100° C. at reduced pressures or higher at higher pressures.

While the 3,3,4,4-tetrafluoro-2,2-dihalocyclobutanones are quite reactive chemical intermediates, they are stable. Thus, these 3,3,4,4-tetrafluoro-2,2-dihalocyclobutanones are very stable to acids even at elevated temperatures, e.g., 150–300° C. They rapidly and spontaneously form hydrates and hemiketals. The hydrates readily cleave upon aqueous base hydrolysis to form the corresponding tetrafluorodihalobutyric acids. Finally, the 3,3,4,4-tetrafluoro-2,2,-dihalocyclobutanones serve generically as intermediates to the previously known, but extremely difficult accessible, tetrafluorodihalocyclopropanes. Simple illumination with ultraviolet light at room temperature of the 3,3,4,4-tetrafluoro-2,2-dihalocyclobutanones results in substantially quantitative conversion to the corresponding tetrafluorodihalocyclopropanes with the elimination of carbon monoxide.

Additional and specific utilities of the compounds of the process of this invention are illustrated as follows:

EXAMPLE A

The tetrafluorodihalocyclobutanones are generically useful as waterproofing agents. They are of particular utility in waterproofing polyvinyl alcohol, e.g., in shaped object form. Thus, it is only necessary that the shaped polyvinyl alcohol object be exposed to the vapors and/or the liquid form of these tetrafluorodihalocyclobutanones.

More specifically, a one part sample of film, prepared from a commercially available polyvinyl alcohol by conventional casting procedures, was placed in a cylindrical glass reactor and heated therein with pumping at steam bath temperatures for one hour under reduced pressure corresponding to 1 mm. of mercury to remove what traces there may have been of trapped water and/or oxygen on the surfaces of and possibly within the film. About forty parts of perfluorocyclobutanone (see Example I) was then distilled in and the sealed reactor was heated for two hours at steam bath temperatures. The reactor was then cooled to room temperature, opened, and the remaining ketone removed by distillaiton under reduced pressure. The polyvinyl alcohol film appeared substantially unchanged, retaining both its strength and shape but acquiring a very slight haze during the treatment.

The film was placed in liquid water which was then warmed to 60° C. The treated film still retained dimensional stability and substantially its initial strength. In contrast, a control, i.e., untreated, film of polyvinyl alcohol from the same batch of commercial polymer when placed in liquid water partly dissolved almost immediately and in a few minutes become a gel with no definite shape. The treated film was allowed to stand for a period of five days in liquid water. At the end of this time it still retained its initial dimensions, i.e., was dimensionally stable, and likewise appeared to exhibit essentially its initial strength. Substantially the same results were achieved with ten parts of the 2-chloro-2,3,3,4,4-pentafluorocyclobutanone of Example V.

EXAMPLE B

In addition to the above-described waterproofing characteristics, the tetrafluorodihalocyclobutanones exhibit swelling and, in sufficiently high concentrations, solvent action on ester addition polymers, particularly of the polyvinyl type, e.g., polyvinyl acetate. Thus, these polyfluorocyclobutanones are useful as plasticizers for such polymers in film and fiber form, and more particularly, are useful as solvents for such polymers in the preparation of shaped objects therefrom, e.g., in the casting of films or the spinning of fibers and filaments.

Thus, a one part strip of film prepared from a commercially available polyvinylacetate was placed in a cylindrical glass reactor and heated with pumping at steam bath temperatures for one hour under a reduced pressure corresponding to 1 mm. of mercury to thoroughly free the film sample from adsorbed water and/or oxygen. About forty parts of perfluorocyclobutanone (see Example I) was then distilled in and the sealed reactor was heated for two hours at steam bath temperatures. The polyvinylacetate film swelled in the ketone vapors and ultimately dissolved in the liquid ketone. The reactor was then cooled to room temperature, opened, and the perfluporocyclobutanone removed by pumping at reduced pressure. As the ketone was removed, the polyvinylacetate came out of solution in substantially unchanged appearance and was deposited as a film in the bottom of the reactor roughly corresponding to the original liquid level. Substantially the same results were obtained with another sample of the commercial polyvinylacetate film using as the solvent 2-chloropentafluorocyclobutanone (see Example V).

Since obvious modifications in the invention will be evident to those skilled in the art, I propose to be bound solely by the appended claims.

The embodiments of the invention in which an exclusive property or privilege is claimed are defined as follows:

1. The method of preparing a 3,3,4,4-tetrafluoro-2,2-dihalocyclobutanone which comprises (1) reacting, at a temperature of about 125–250° C., a 1,1-difluoro-2,2-dihaloethylene wherein all halogen is of an atomic number between 9 and 35, inclusive, and a perfluorovinyl hydrocarbyl ether wherein the hydrocarbyl radical is monovalent aliphatically saturated hydrocarbon of up to 7 carbons and (2) hydrolyzing the resultant 2,2-dihalo-1,3,3,4,4-pentafluorocyclobutyl hydrocarbyl ether with sulfuric acid of a strength of about 75–98% by weight at a temperature of about 125–300° C.

2. In the preparation of a 3,3,4,4-tetrafluoro-2,2-dihalocyclobutanone, the step of hydrolyzing a 2,2-dihalo-1,3,3,4,4-pentafluorocyclobutyl hydrocarbyl ether wherein all halogen is of an atomic number between 9 and 35, inclusive, and the hydrocarbyl radical is monovalent, aliphatically saturated hydrocarbon of up to 7 carbons with sulfuric acid of a strength of about 75–98% by weight at a temperature of about 125–300° C.

3. In the preparation of a 3,3,4,4-tetrafluoro-2,2-dihalocyclobutanone, the step of dehydrating a 3,3,4,4-tetrafluoro-2,2-dihalo-1,1-dihydroxycyclobutane wherein all halogen is of an atomic weight between 9 and 35, inclusive, by means of a strong dehydrating agent at a temperature of about 60–100° C.

4. The method of preparing perfluorocyclobutanone which comprises sequentially (1) reacting, at a temperature of about 125–250° C., tetrafluoroethylene and a perfluorovinyl hydrocarbyl ether wherein the hydrocarbyl radical is monovalent aliphatically saturated hydrocarbon of up to 7 carbons and (2) hydrolyzing the resultant heptafluorocyclobutyl hydrocarbyl ether with sulfuric acid of a strength of about 75–98% by weight at a temperature of about 125–300° C.

5. In the preparation of perfluorocyclobutanone, the step of hydrolyzing a heptafluorocyclobutyl hydrocarbyl ether wherein the hydrocarbyl radical is monovalent aliphatically saturated hydrocarbon of up to 7 carbons with sulfuric acid of a strength of about 75–98% by weight at a temperature of about 125–300° C.

6. In the preparation of perfluorocyclobutanone, the step of dehydrating hexafluoro-1,1-dihydroxycyclobutane by means of a strong dehydrating agent at a temperature of about 60–100° C.

7. The method of preparing 2-chloro-2,3,3,4,4-pentafluorocyclobutanone which comprises sequentially (1) reacting, at a temperature of about 125–250° C., chlorotrifluoroethylene and a perfluorovinyl hydrocarbyl ether wherein the hydrocarbyl radical is monovalent aliphatically saturated hydrocarbon of up to 7 carbons and (2) hydrolyzing the resultant 2-chloro-1,2,3,3,4,4-hexafluorocyclobutyl hydrocarbyl ether with sulfuric acid of a strength of about 75–98% by weight at a temperature of about 125–300° C.

8. In the preparation of 2-chloro-2,3,3,4,4-pentafluorocyclobutanone, the step of hydrolyzing a 2-chloro-1,2,3,3,4,4-hexafluorocyclobutyl hydrocarbyl ether wherein the hydrocarbyl radical is monovalent aliphatically saturated hydrocarbon of up to 7 carbons with sulfuric acid of a strength of about 75–98% by weight at a temperature of about 125–300° C.

9. The method of preparing 2,2-dichloro-3,3,4,4-tetrafluorocyclobutanone which comprises (1) reacting, at a temperature of about 125–250° C., 1,1-dichloro-2,2-difluoroethylene and a perfluorovinyl hydrocarbyl ether wherein the hydrocarbyl radical is monovalent aliphatically saturated hydrocarbon of up to 7 carbons and (2) hydrolyzing the resultant 2,2-dichloro-1,3,3,4,4-pentafluorocyclobutyl hydrocarbyl ether with sulfuric acid of a strength of about 75–98% by weight at a temperature of about 125–300° C.

10. In the preparation of 2,2-dichloro-3,3,4,4-tetrafluorocyclobutanone, the step of hydrolyzing a 2,2-dichloro-1,3,3,4,4-pentafluorocyclobutyl hydrocarbyl ether wherein the hydrocarbyl radical is monovalent aliphatically saturated hydrocarbon of up to 7 carbons with sulfuric acid of a strength of about 75–98% by weight at a temperature of about 125–300 °C.

11. The process of claim 10 wherein the 2,2-dichloro-1,3,3,4,4-pentafluorocyclobutyl hydrocarbyl ether is 2,2-dichloro-1,3,3,4,4-pentafluorocyclobutyl methyl ether.

12. In the preparation of 2,2-dichloro-3,3,4,4-tetrafluorocyclobutanone, the step of dehydrating 2,2-dichloro-3,3,4,4-tetrafluoro-1,1-dihydroxycyclobutane by means of a strong dehydrating agent at a temperature of about 60–100° C.

13. The method of preparing 2-bromo-2,3,3,4,4-pentafluorocyclobutanone which comprises sequentially (1) reacting, at a temperature of about 125–250° C., bromotrifluoroethylene and a perfluorovinyl hydrocarbyl ether wherein the hydrocarbyl radical is monovalent aliphatically saturated hydrocarbon of up to 7 carbons and (2) hydrolyzing the resultant 2-bromo-2,2,3,3,4,4-hexafluorocyclobutyl hydrocarbyl ether with sulfuric acid of a strength of about 75–98% by weight at a temperature of about 125–300° C.

14. In the preparation of 2-bromo-2,3,3,4,4-pentafluorocyclobutanone, the step of hydrolyzing a 2-bromo-2,2,3,3,4,4-hexafluorocyclobutyl hydrocarbyl ether wherein the hydrocarbyl radical is monovalent aliphatically saturated hydrocarbon of up to 7 carbons with sulfuric acid of a strength of about 75–98% by weight at a temperature of about 125–300° C.

References Cited in the file of this patent

UNITED STATES PATENTS 3,039,995   England _____ June 19, 1962

OTHER REFERENCES

Coffman et al.: J. Am. Chem. Soc., Vol. 71, pp. 490–6 (1949).